(No Model.) 2 Sheets—Sheet 1.

G. T. LEWIS & E. O. BARTLETT.
Apparatus for Catching and Collecting Lead Fumes.
No. 242,460. Patented June 7, 1881.

Attests:

Inventor
George T. Lewis and
Eayre O. Bartlett
By their atty.

(No Model.) 2 Sheets—Sheet 2.

G. T. LEWIS & E. O. BARTLETT.
Apparatus for Catching and Collecting Lead Fumes.

No. 242,460. Patented June 7, 1881.

UNITED STATES PATENT OFFICE.

GEORGE T. LEWIS, OF PHILADELPHIA, PENNSYLVANIA, AND EAYRE O. BARTLETT, OF PEMBERTON, NEW JERSEY.

APPARATUS FOR CATCHING AND COLLECTING LEAD-FUMES.

SPECIFICATION forming part of Letters Patent No. 242,460, dated June 7, 1881.

Application filed October 5, 1880. (No model.)

*To all whom it may concern:*

Be it known that we, GEORGE T. LEWIS, of Philadelphia, in the State of Pennsylvania, and EAYRE O. BARTLETT, of Pemberton, in the State of New Jersey, have invented an Improvement in Apparatus for Catching and Collecting Lead-Fumes, of which the following is a specification.

Our invention relates to an improvement in the means for catching and collecting the lead-fumes produced by the process as patented to us, and carried on in the apparatus shown and described in the patent to Lewis, dated March 4, 1879, and numbered 212,855.

Lead-fumes, which are the waste product of roasting, smelting, and refining furnaces, are usually gray, and sometimes black, in color, which color is due to particles of carbon, in a fine state of subdivision, and soot, and though of a high specific gravity, as is the case with all lead compounds, they are very bulky, owing to the extremely fine state of subdivision in which they are, and their being most intimately mixed with air, which can only be eliminated, and with difficulty, by being pressed out of the powder. This bulky and powdered state of these waste lead-fumes makes it difficult to handle them, and impossible to smelt them down in the crude state and unmixed with other substances, owing to their being drawn through the chimney by the strong draft of the furnace and lost. To prevent this loss the fumes are mixed with lime-water or thin milk of lime, and dried before smelting, or, still better, they are roasted in a reverberatory or other suitable furnace, in which the free oxide of lead present will melt to about one-half of its bulk and cement the remaining particles together, so that the fumes become hard and granular. These processes, however, are expensive, as it requires much handling of the lead-fumes, much labor, a greater quantity of fuel, and expensive apparatus, &c.

We have overcome the above objectionable features, and accomplish the same end at a much less expense in every way, and with simple apparatus, as hereinafter set forth.

Figure 1:
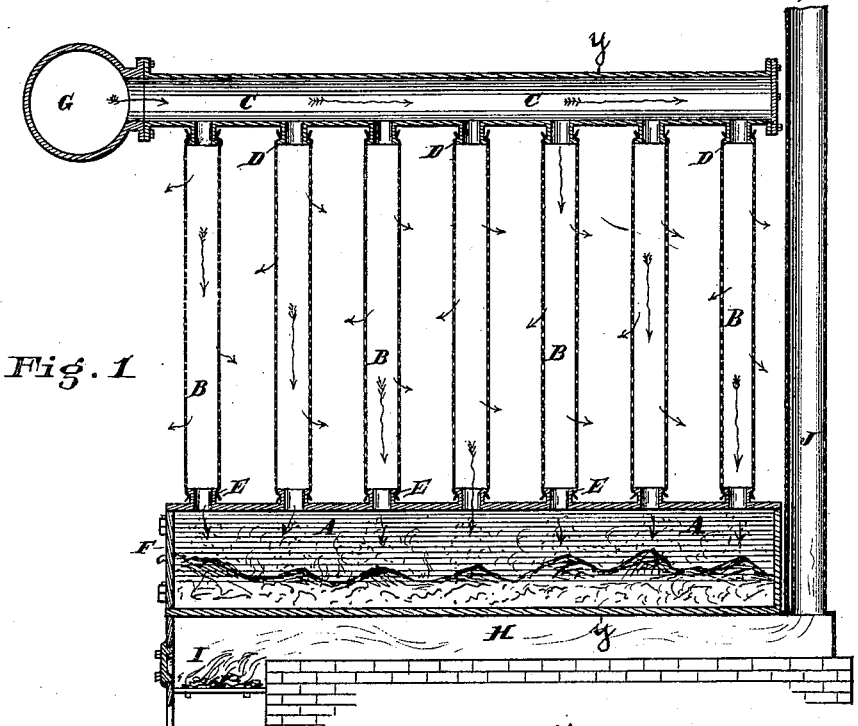
Figure 2:
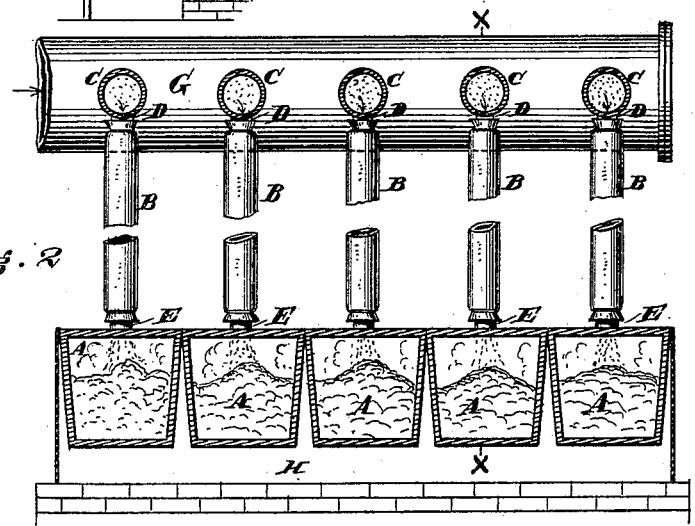
Figure 3:
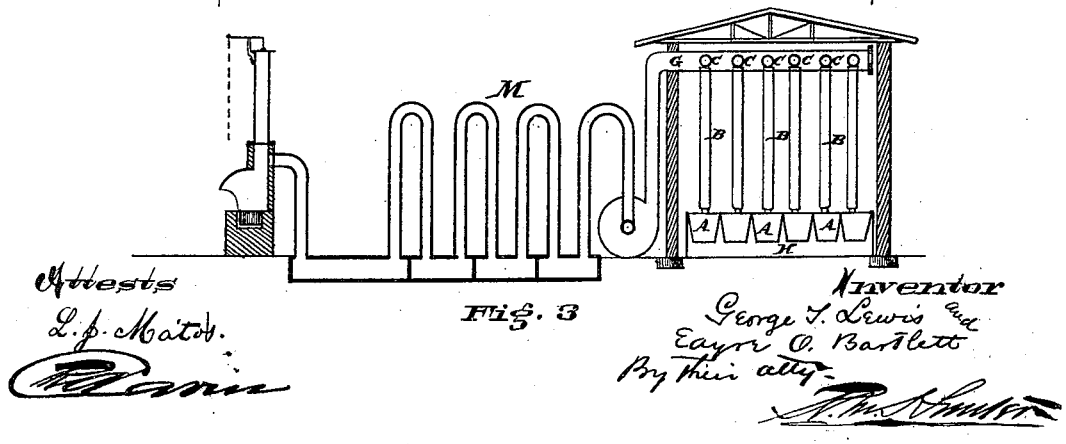
Figure 4:
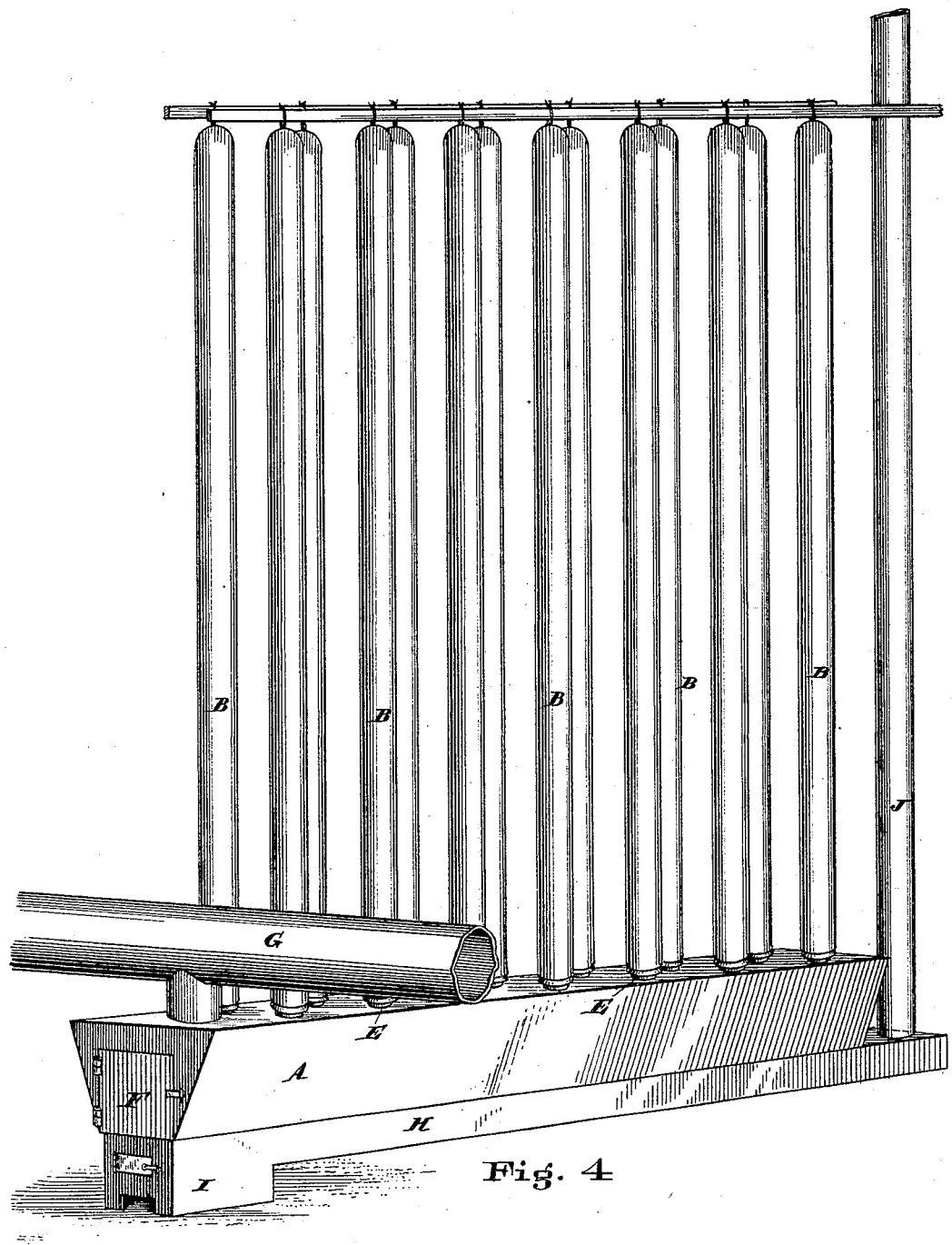

In the drawings, Figure 1 is a longitudinal cross-section of our improved apparatus on the line $x\ x$ of Fig. 2. Fig. 2 is a cross-section of the same on the line $y\ y$ of Fig. 1. Fig. 3 shows a general elevation of an entire works having embodied in it our improvements. Fig. 4 is a modified form of apparatus.

In the apparatus set forth in our patent of 1879 the main G in the catching-chamber is provided with a series of branch tubes, C, projecting horizontally from one or both sides, the lower or under sides of these branch tubes being provided with a series of short necks, D, to which bags of textile fabric are fastened. To these necks D the apparatus remains the same, but in place of the bags simple tubes of textile fabric open at both ends are secured to the necks D, substantially in the same manner as the bags, and the lower ends of these tubes are fastened in a similar manner over the necks E, which project from the cover of the bins A and open in them.

The necks E may form part of the bin or its cover, or may be separate and distinct and bolted to the same.

The bin A is made of sheet-iron or other suitable material, and of any shape desirable. The cover or top may be movable or firmly secured to the body, and one or both ends of the bin may be provided with tight doors F for discharging and cleaning purposes.

Situated under the bins A is a small furnace, H, to be used only in special cases, and, if desired, may be dispensed with altogether without altering our invention.

The grate I of this furnace may be located at one end of the bins A and the heating-chamber made under them, and the chimney J at the opposite end, as shown in the drawings. If desired, a separate furnace may be applied to each and every bin.

In place of bringing the main G to the top of the building it may be laid near the ground and in direct communication with the bins A, as shown in Fig. 4, and the bags B open into the bin at the top and are hung from the roof of the building. In practice we prefer this construction, since it deposits the fumes in the bin without unnecessary cooling. If desired, the tubes M of the old apparatus may be dispensed with. Under the bin A is the furnace I H, as in the case previously described.

The operation of the apparatus is as follows: The lead-fumes being generated, as set forth in the various patents to us, and particularly in the patent referred to above, they are forced into the main G, from whence they pass into the auxiliary or branch tubes C, through the necks D, tubes of textile fabric B, necks E, and into the bins A.

In smelting-furnaces using certain kinds of fuel the heat and amount of soot or carbon carried by the said fumes into the bins are usually sufficient to cause the collected fumes to undergo calcination or combustion after settling in the bins, due to the burning of the carbon by the oxygen carried in with the fumes and oxidizing the carbonic oxide present, producing the less injurious carbonic acid. The fumes become roasted after a short time, and are taken out through the doors F, or by other means, and upon examination will prove to be a hard porous mass easy to handle and smelt. With other furnaces the bins will become cold and remain so, if not otherwise heated, owing to the gases leaving the furnace in a cold state and entering the bins in this cold condition; but in such cases it is only necessary to build a small fire in the grate I under the said bins, the flame and smoke passing through the furnace H and out by the chimney J. By this means sufficient heat is generated to perform the office of the burning carbon in the first instance.

The fumes in the bin must be heated, but whether they are heated by calcination or externally it is immaterial to our invention.

Other advantages are also obtained, particularly where the apparatus is in connection with a cupola smelting-furnace, where the gases are rather cold when they leave said furnace and contain much of the extremely poisonous carbonic-oxide gas, for in this case most of the carbonic-oxide gas becomes oxidized into the much less dangerous carbonic-acid gas, which may, by drafts and ventilation, be rendered perfectly harmless. The gases in this case often contain much moisture, which is liable to condense in the bags or tubes, and by so doing would cover the tubes of textile fabric with an impenetrable coat of moist lead-fumes, making the textile fabric useless as a strainer; but by the heat produced in the bins the temperature is practically found to be raised just enough to prevent this condensation of the moisture without scorching the textile fabric.

When the fumes pass to the bin the gases pass off through the tubes of textile fabric, and when the fumes are sufficiently roasted and cemented together they are discharged or withdrawn through the doors F.

This apparatus is adapted to the smelting of argentiferous or auriferous lead ores, or to the lead-refining furnaces in general.

We are aware that bags of textile fabric have been used in which to collect lamp-black, and that said bags are connected alternately at the top and bottom, and are provided with metallic slides at the bottom for the removal of the lamp-black; but the small cone-shaped pieces to which the slides are attached are in no sense a bin, and if used in our process would ruin the bags in a short period of time, and the last bag is open to the atmosphere through wire strainers; whereas in our device the gases must pass through the bags to escape, and a series of bags open into a large bin, the bottom of which is sufficiently removed from the bags to collect a large amount of fumes and allow combustion of the same without injury to the bags.

Having now described our invention, what we claim as new, and desire to secure by Letters Patent, is—

1. In apparatus for collecting waste lead-fumes from lead-smelting furnaces, &c., the combination of a tube or bag of textile fabric, through the meshes of which the escaping gases pass, and a closed bin of larger diameter than the tube or bag, and adapted to receive the products and allow combustion to go on at a distance from said fabric and without injury to said bags or tubes, said bin being located under said bags or tubes and opening into the same, substantially as and for the purpose specified.

2. In apparatus for collecting waste lead-fumes from lead-smelting furnaces, &c., the combination of bin A, tube or bag of textile fabric B, and auxiliary furnace under said bin, substantially as and for the purpose specified.

3. In combination with apparatus to generate and cool lead-fumes, the main G, branch tubes C, provided with a series of necks, D, tubes of textile fabric B, bins A, provided with series of necks E, and discharging and cleaning doors, and a furnace located under said bins, substantially as and for the purpose specified.

4. In apparatus for collecting and purifying waste lead-fumes to be afterward treated in a smelting furnace, a large bin closed on all sides and provided with an inlet to admit fumes from the furnace, and an outlet covered with textile fabric, through which the gases must pass, said bin being adapted to receive fumes mixed with carbon, and in which said products undergo calcination at a distance sufficiently removed from the textile fabric not to allow of its destruction by heat, as and for the purpose specified.

5. In apparatus for collecting lead-fumes from lead-smelting furnaces, &c., the bin A, closed on all sides, top, and bottom, provided with a discharging and cleaning door, F, a series of bags, B, of textile fabric, opening into said bin, and a main, G, to admit the fumes, substantially as and for the purpose specified.

6. The herein-described process of purifying lead-fumes from lead-smelting or refining furnaces, consisting in passing said fumes mixed with carbon into a closed receptacle and burning said carbon at a low temperature, substantially as set forth, and for the purpose specified.

In testimony of which invention we hereunto set our hands.

GEORGE T. LEWIS.
EAYRE O. BARTLETT.

Witnesses:
ALBERT H. WALTERS,
H. R. SHULTZ.